United States Patent

Gierling et al.

Patent Number: 6,050,917
Date of Patent: Apr. 18, 2000

[54] CVT CONTROL METHOD

[75] Inventors: Armin Gierling, Langenargen; Holger Bacher, Lindau, both of Germany

[73] Assignee: ZF Friedrichshafen AG, Friedrichshafen, Germany

[21] Appl. No.: 09/308,111

[22] PCT Filed: Nov. 28, 1997

[86] PCT No.: PCT/EP97/06640

§ 371 Date: May 12, 1999

§ 102(e) Date: May 12, 1999

[87] PCT Pub. No.: WO98/25055

PCT Pub. Date: Jun. 11, 1998

[30] Foreign Application Priority Data

Dec. 4, 1996 [DE] Germany .................. 196 50 218

[51] Int. Cl.[7] .................................................. B60K 41/12
[52] U.S. Cl. .................................................. 477/45; 477/46
[58] Field of Search .................................. 477/45, 46, 47, 477/48, 49; 701/60, 61

[56] References Cited

U.S. PATENT DOCUMENTS 4,698,764  10/1987  Inagaki et al. .................. 364/424.1
5,947,862  9/1999   Knapp et al. .................... 477/46
5,967,918  10/1999  Knapp et al. .................... 474/28

FOREIGN PATENT DOCUMENTS

| 0 228 884 A1 | 7/1987 | European Pat. Off. . |
| 0 228 884 B1 | 7/1987 | European Pat. Off. . |
| 43 12 745 C2 | 10/1994 | Germany . |
| 44 11 628 A1 | 5/1995 | Germany . |
| 44 11 939 A1 | 10/1995 | Germany . |
| 44 36 506 A1 | 4/1996 | Germany . |
| 63-203438 | 8/1988 | Japan . |

*Primary Examiner*—Charles A Marmor
*Assistant Examiner*—Tisha D. Waddell
*Attorney, Agent, or Firm*—Davis and Bujold

[57] ABSTRACT

For a CVT it is proposed to determine an operating point from the number of revolutions of the primary disc (12) and the number of revolutions of the secondary disc (13). The operating point is assigned to a first characteristic field which has ranges of unauthorized ratios and one range of authorized ratio. If an error occurs, the pressure level in the adjustment area of the secondary disc (pSEK) is increased in a first step. If the error continues an emergency program is activated in a second step.

5 Claims, 5 Drawing Sheets

CVT CONTROL METHOD

BACKGROUND OF THE INVENTION

The invention concerns a method for control of a CVT in which an electronic control unit detects and monitors the speed signals of a primary and a secondary disc.

The methodical operation of CVT is usually monitored by an electronic control unit. EP-PS 0228884 thus proposes to monitor the methodical operation of two speed sensors assigned to the primary and secondary taper disc pairs. Hereby is tested whether or not the speed signal is present. In the absence of speed of the secondary taper disc pair, it is proposed to adjust the reduction ratio to a fail-safe value. In the absence of the speed of the primary disc pair, it is proposed that the speed of the primary taper disc pair be adjusted to a fail-safe value.

The above described prior art has the disadvantage that brief failures are interpreted as an absence of the speed signal.

SUMMARY OF THE INVENTION

In view of the above, the invention is to solve the problem of providing for a CVT, a method which detects brief failures of the speeds of the primary and the secondary disc pairs and reacts thereto with adequate flexibility.

According to the invention, the problem is solved by the fact that in the presence of a stationary state while driving, a ratio of the variator is determined from the speed signals of the primary and secondary discs, the ratio is assigned to a first characteristic field, said characteristic field having one range of authorized ratios and ranges of unauthorized ratios. An error is detected when the ratio is in an unauthorized range and with detection of the error the pressure level of the variator is increased in a first step and if the error continues an emergency program is activated in a second step.

The solution, according to the invention, offers the advantage that by assigning the ratio to ranges of authorized and unauthorized ratio, not only is there tested the presence of speed signals per se, but also the correctness thereof in the stationary and dynamic ranges. If it is found that the ratio lingers in an unauthorized range, in adequate flexible reaction thereto the level of contact pressure of the variator is increased. In case the error continues, an emergency drive program is activated in a second step.

In a development of this, it is proposed that the range of authorized ratios has as upper limit the highest possible ratio of the variator and as lower limit the minimum possible ratio of the variator and, in development of this, it is proposed that the characteristic field has an additional range of stoppage, an error within this range existing when the number of revolutions of the primary disc is higher than the product of the number of revolutions of the secondary disc multiplied by the maximum possible ratio of the variator.

In a development, it is proposed that in the absence of error during a dynamic operation, an actual gradient of the ratio be determined from the ratio of the variator at a first and at a second moment. Thereafter, an operating point is determined from the actual gradient and the number of revolutions of the secondary disc at the second moment. This operating point is assigned to a second characteristic field, wherein the second characteristic field has a range of authorized and a range of unauthorized operating points. An error is detected when the operating point is in the range of unauthorized operating points wherein, with the detection of the error, in a first step the contact pressure level on the variator is increased and if the error continues, an emergency drive program is activated in a second step. This development offers the advantage that after it having been found, via the first characteristic field, that an operating point is in the authorized range, it is additionally tested, via the second characteristic field, whether the dynamics of adjustment of the variator coincide with predetermined values. In other words, by said additional function is tested whether slip occurs on the variator in the dynamic operation. In CVT of the taper disc continuously variable type, a slip between the taper discs and the continuously variable member is known to result in damage of the continuously variable member. The same applies to a toroidal CVT.

In development of this, it is proposed that in the absence of error, the actual gradient be compared with the theoretical gradient and therefrom, by difference formation a divergence be detected which is then subsequently processed.

This development offers the advantage of there being detected lingering divergences, i.e. which have an effect upon the adjustment dynamics.

BRIEF DESCRIPTION OF THE DRAWING(S)

A preferred embodiment is shown in the drawings wherein.

DESCRIPTION OF THE PREFERRED EMBODIMENT(S)

Figure 1:
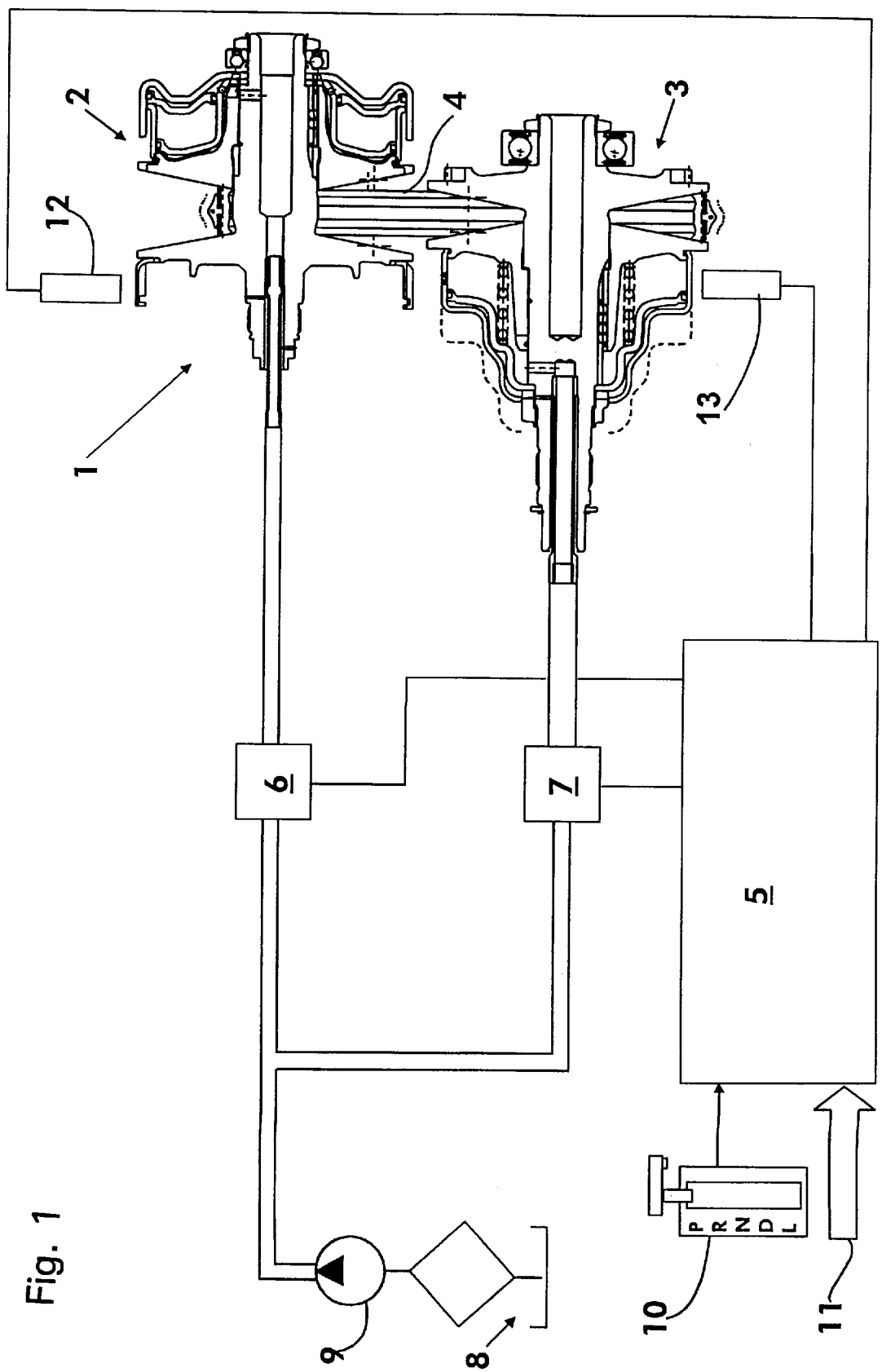
FIG. 1 is a system diagram.

FIG. 1 shows a reduced system of diagram of a CVT of the taper disc continuously variable type. The complete system was disclosed in ATZ Automobiltechnische Zeitschrift 96 1994) 6, page 380. A variator is shown with reference numeral 1. It comprises a primary taper disc pair 2 located on the input side, a continuously variable member 4 and a secondary disc pair 3 located on the output side. Each taper disc pair consists of one taper disc stationary in axial direction and one taper disc movable in axial direction. By the axial position of the movable taper disc is determined the spin radius of the continuously variable member and thus the ratio. An electronic control unit 5 receives a signal from a selector lever 10, a speed signal of the primary disc 12, a speed signal of the secondary disc 13 and input parameters 11. Input parameters are, e.g. the signal of a throttle valve, the temperature of the hydraulic medium, etc. From said input parameters, the electronic control unit 5 determines the operating parameters of the CVT, e.g the ratio, the operating point and the pressure level in the primary and secondary discs. By means of an electromagnetic pressure regulator 6, the electronic control unit 5 determines the pressure level in the adjustment area of the primary taper disc pair and by a pressure regulator 7, the pressure level in the adjustment area of the secondary taper disc pair. Hereby is established, via the pressure level in the adjustment area of the primary disc, an input speed of the CVT, i.e. the speed of an internal combustion engine. By the pressure level of the secondary disc is determined the contact pressure continuously variable member/secondary disc pair 3, thus the torque-transmitting capacity of the system. Pressure is supplied to the two pressure regulators 6 and 7 by a pump 9 which conveys the hydraulic medium from an oil pan 8 via a filter without reference numeral.

Figure 2:
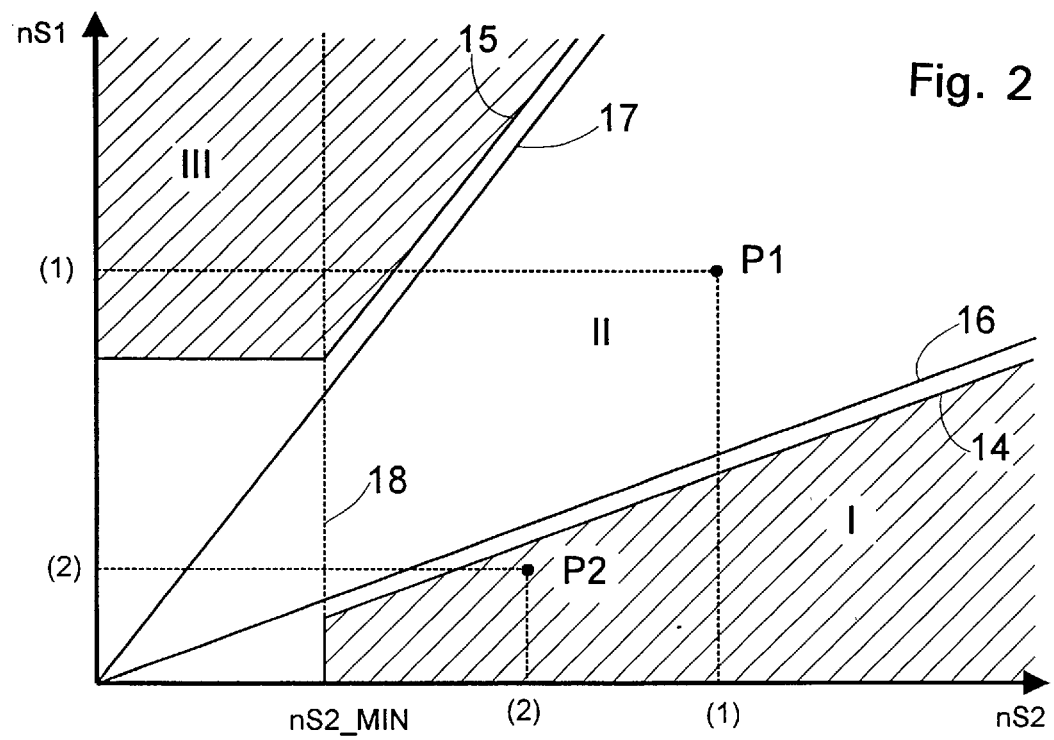
FIG. 2 is a first characteristic field.

FIG. 2 shows a first characteristic field. On the abscissa are plotted speed values of the secondary disc (nS2) and on the ordinate speed values of the primary disc (nS1). The characteristic field contains three ranges: ranges I and III represent ranges of unauthorized operating points and range 11 represents a range of authorized operating points. A line 14 forms the upper limit of range 1. A line 15 forms the lower limit of range III. The maximum possible ratio range of the variator is shown by the lines 16 and 17. In other words, within said two lines 16 and 17 the ratio of the variator can be changed. As can be seen from FIG. 2, the line 16 does not coincide with the line 14 nor the line 17 with the line 15. The range of authorized ratios is formed from the lines 15 and 14. In FIG. 2 is additionally shown with reference numeral 18 a dotted line that delimits the range of stoppage. The range extends thus from the zero point to the abscissa value nS2_min. The operating points of the first characteristic field are determined by calculating, in the presence of a stationary state while driving (nS2>limit value), from the speed signals of the primary disc (nS1) and secondary disc (nS2) a ratio of a variator (iV=nS1/nS2). In FIG. 2 is shown an operating point P1 with the appertaining speed values of the primary disc (nS1) and the secondary disc (nS2). In this example, the operating point P1 is in the range II, thus in the authorized range. The operating point P2 is in the range I, i.e. a range of unauthorized operating points. This operating point is detected as error. With the detection of the error, the contact pressure level of the variator is increased in a first step. If the operating point continues in an unauthorized range, an emergency drive program is activated in a second step. Such an emergency drive program is known, e.g. from DE-OS 44 36 506.

Figure 3:
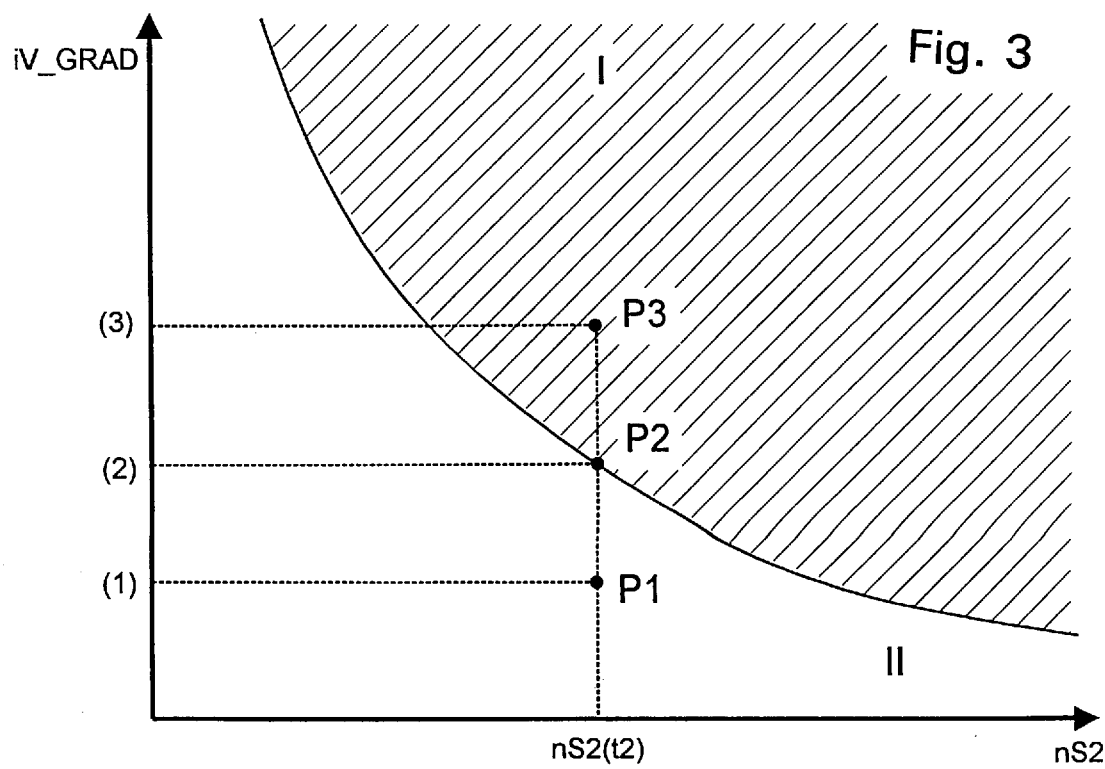
FIG. 3 is a second characteristic field.

In FIG. 3 is shown a second characteristic field. This second characteristic field is used when it resulted form the test of the operating point, according to the first characteristic field of FIG. 2, that the operating point lies in the authorized range I. In this second characteristic field, speed values of the secondary disc (nS2) are shown on the abscissa and values of the gradient of ratio of the variator (iV_GRAD) on the ordinate. This second characteristic field shows a range I which represents the range of unauthorized operating points. The range II represents the range of authorized operating points. The operating points are detected by determining during a dynamic operation, from the ratio of the variator at a first and at a second moment, an actual gradient of the ratio. The operating point is then established from this actual gradient and the speed of the secondary disc at the second moment. In FIG. 3 are shown three examples, namely, operating points P1, P2 and P3. All three operating points have here the same abscissa value, namely, nS2(t2). The operating point P3 results from the abscissa value and the gradient of the change of ratio (iV-GRAD) with the value (3). The operating point P3 is herein the range I, i.e. the unauthorized operating range. This case arises when slip occurs on the system variator/continuously variable member. As reaction to the fact that the operating point is in the unauthorized range, the contact pressure level on the variator is increased. If the operating point P3 continues in the unauthorized range I, an emergency drive program is activated in a second step. The operating point P2 is on the dividing line between the ranges I and II, ordinate value (2). This operating point P2 is in the authorized range. Likewise, the operating point P1 is in the authorized range, ordinate value (1). From this second characteristic field, it is further possible to deduce whether the adjustment gradient of the variator, i.e. the actual value, diverges from a theoretical value. The theoretical value of the adjustment gradient can be predetermined, e.g. by the driving strategy. The divergence can be determined by difference formation and then subsequently processed, e.g. as control divergence for an added control circuit or a limitation of the driving strategy dynamics. The introduction of the additional second characteristic field thus offers the advantage of it being possible to detect slip occurring in the dynamic operation within the authorized range of the first characteristic field. By comparison of theoretical and actual values of the adjustment dynamics can also be detected unauthorized driving strategy standards, etc., e.g. control divergence, leakage.

Figure 4:
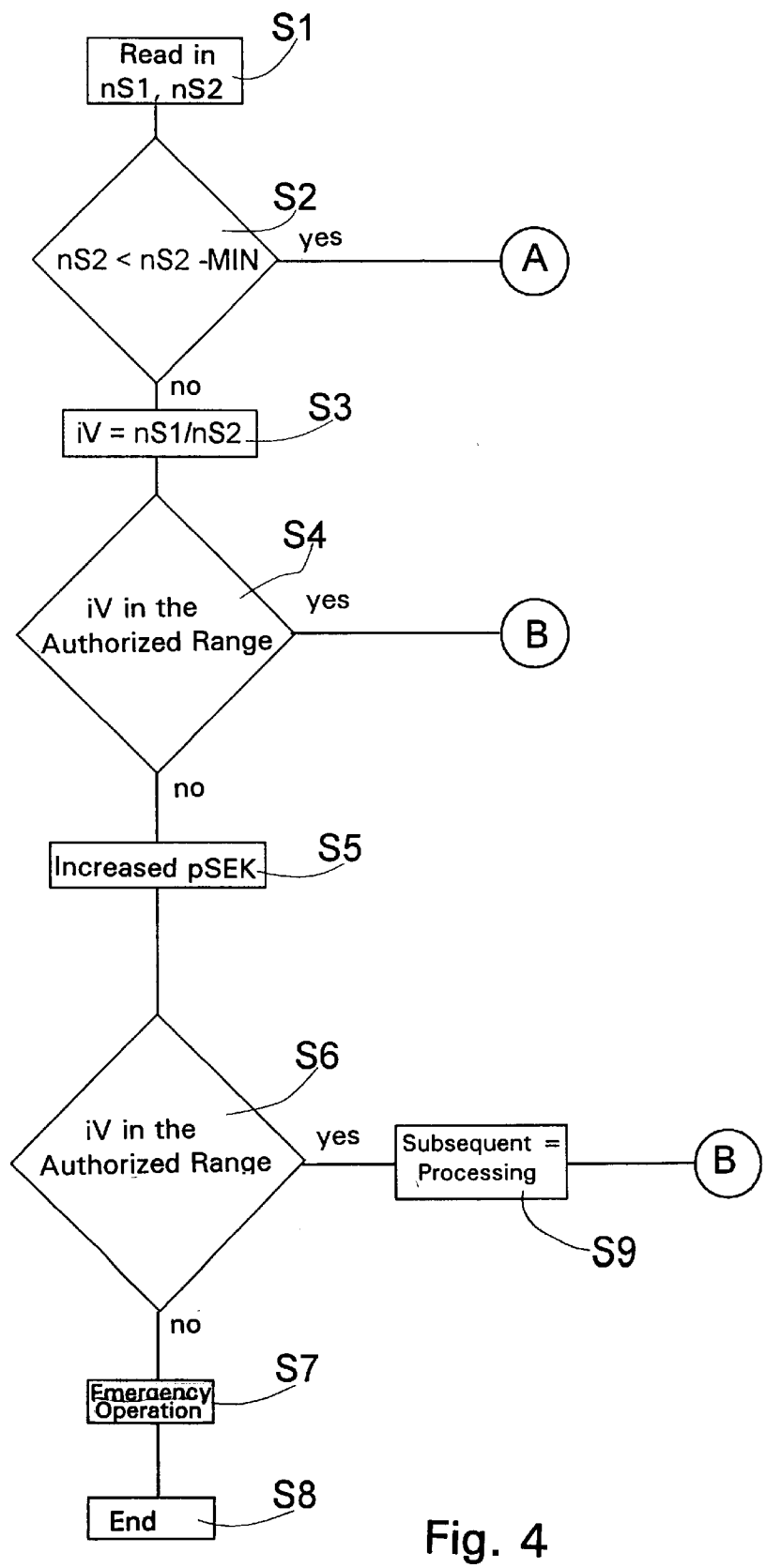
FIG. 4 is a flow chart.

In FIG. 4 is shown a flow chart which is part of a main program. The latter starts with step S1 with the reading in of the number of revolutions of the primary disc (nS1) and the number of revolutions of the secondary disc (nS2). In step S2 is tested whether the number of revolutions of the secondary disc is < a limit value, nS2_MIN here. This corresponds to the range of stoppage of FIG. 2. In case of a positive result, i.e. the number of revolutions of the secondary disc is lower than this limit value, the program branches to point A which is explained in relation to FIG. 5. In case of negative result, with step S3 follows the calculation of the ratio of the variator iV, i.e the actual operating point. In step S4 is tested whether the ratio of the variator is in the authorized range. This interrogation corresponds to the test of the operating point by means of the first characteristic field of FIG. 2. If it is established in step S4 that the operating point is in the authorized range, the program branches to point B explained in relation to FIG. 6. In case of negative result, i.e. the operating point is an unauthorized range, the pressure level in the adjustment area of the secondary disc (pSEK) is increased in a first step in step S5. The pressure level, in the adjustment area of the secondary disc (pSEK), is known to be decisive for the torque-transmitting capacity of the variator. By increasing the pressure level is sought to eliminate the previously found slip. In step S6 is tested whether the operating point is now in the authorized range. In case of positive result, in step S9 a contact pressure correction, in the form of a pressure adaptation, is stored over the transmission life cycle, branching to point B. If the result is negative, i.e. a slip continues to be found, with step S7 is activated an emergency drive program such as known, e.g. from DE-OS 44 36 506. In step S8, the program terminates and a return to the main program follows.

Figure 5:
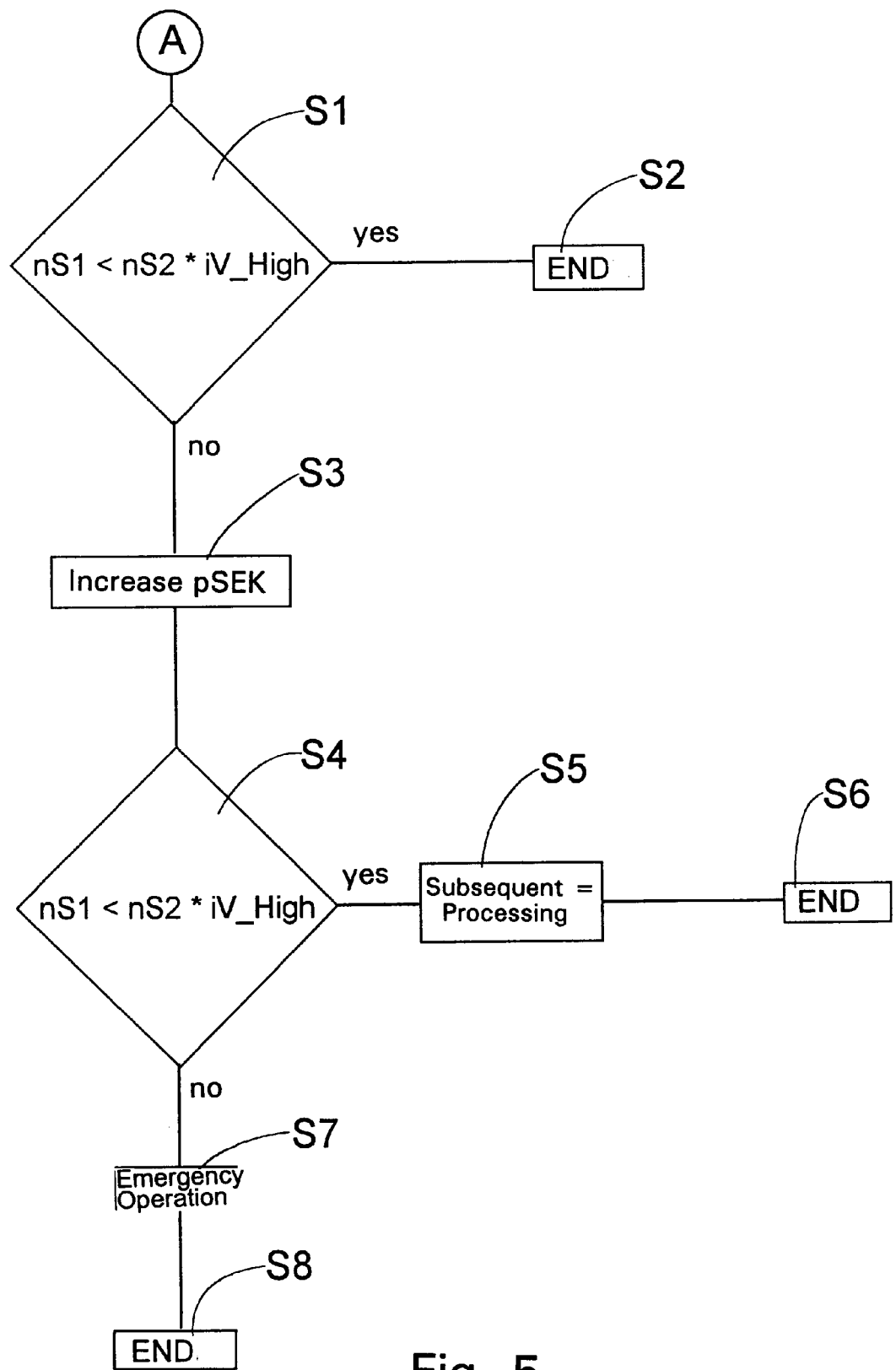
FIG. 5 is a flow chart for detecting stoppage.

FIG. 5 shows a partial program, starting with the branching point A. In step S1 is tested whether the number of revolutions of the primary disc (nS1) is lower than the product from the number of revolutions of the secondary disc (nS2) multiplied by the maximum possible ratio of the variator (i_HIGH). In case of positive result, with step S2 the main program is returned to. In case of negative result, i.e. slip exists in the variator, in step S3, in a first reaction, the pressure level in the adjustment area of the secondary disc (pSEK) is increased. In step S4, again it is tested whether the number of revolutions of the primary disc (nS1) is lower than the previously described product. In case of positive result, i.e. the slip has been eliminated, in step S5 the increase of the contact pressure is stored as adaptive function over the transmission life cycle. Thereafter the main program is returned to with step S6. In case of negative result, i.e. a slip persists, an emergency drive program is activated in step S7 and, with step S8, the main program is returned to.

Figure 6:
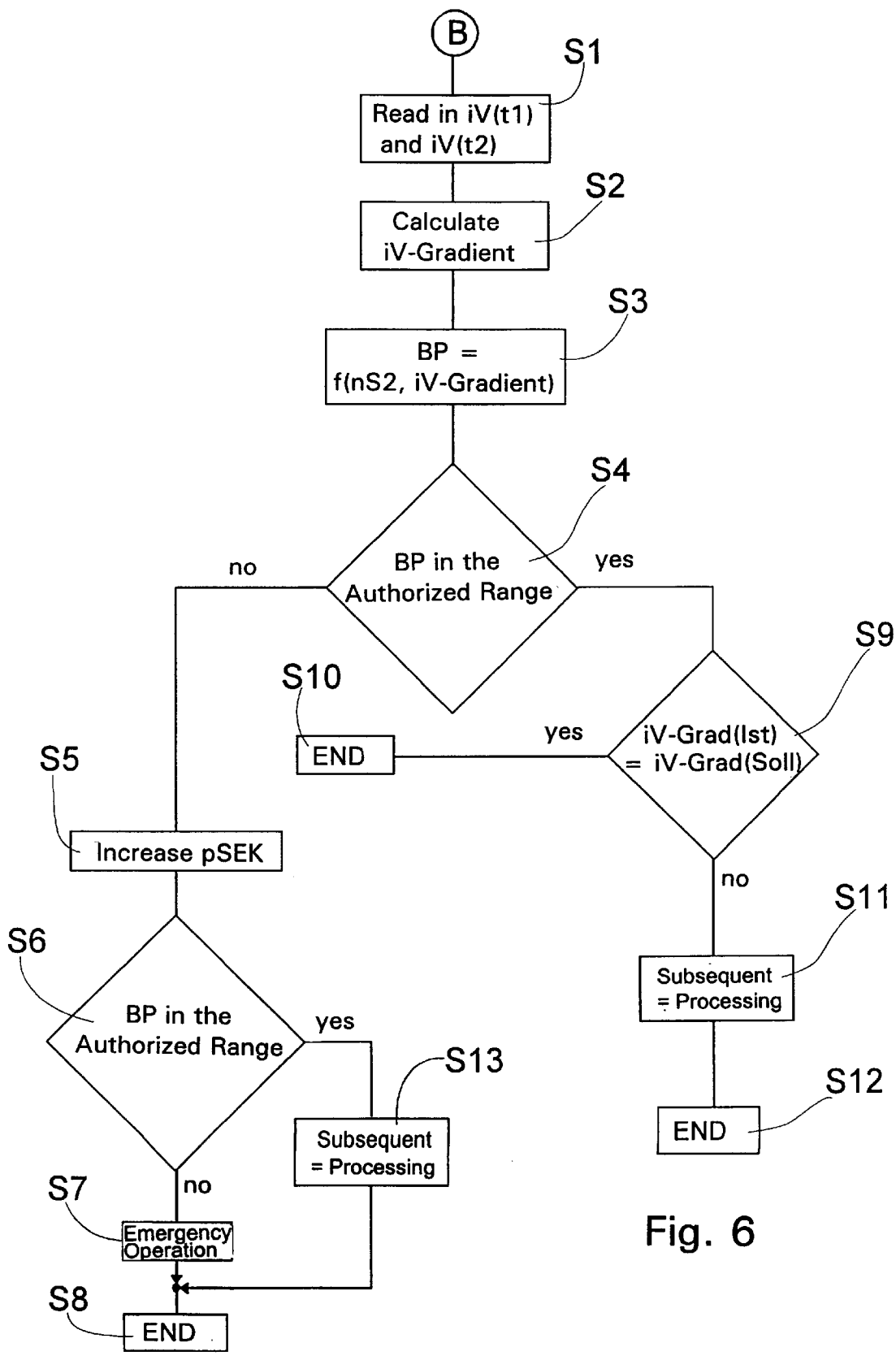
FIG. 6 is a flow chart for testing according to the second characteristic field.

FIG. 6 shows a flow chart, which describes the operation of the second characteristic field, according to FIG. 3. The program starts with point B. In step S1 is read in the ratio of the variator (iV) at a first moment (t1) and at a second moment (t2). In step S2, the gradient (iV-GRAD) is calculated from said two values. In step S3, the operating point is then established. Here the operating point is a function of the number of revolutions of the secondary disc at the second moment (t2) and of the previously calculated gradient of the variator ratio (iV-GRAD). In step S4 is tested whether the operating point is in the authorized range. In case of negative results, i.e. it lies, according to FIG. 3, in the range I, the steps S5, S6, S7, S8 and S13 are run through. In case of positive result, the steps S9, S10, S11 and S12 are run through. If it is found in Step S4 that the operating point is not in the authorized range, as reaction hereto the pressure level in the adjustment area of the secondary disc (pSEK) is increased in step S5. Thereafter, in step S6, it is again tested whether the operating point is now in the authorized range, i.e. whether the slip has been eliminated. In case of positive result, in step S13 the increase of the contact pressure is stored as dynamic contact pressure adaptation. Then it is proceeded with step S8, namely, the return to the main program. In case of negative result, i.e. the operating point still is not in the authorized range, the emergency operation is activated with step S7. In case of positive result in step S4, it is tested in step S9 whether the actual value of the gradient exactly corresponds to a theoretical value. In case of positive result, the main program is returned to with step S10. In case of negative result, the difference between actual and theoretical values is subsequently processed with step S11 and then, with step S12 the main program is returned to. The difference found in step S11 can be used to detect a lingering divergence and subsequently process it in the sense of a control divergence. The method, according to the invention, can be applied not only to CVT's of the taper disc type but also to CVTs of the toroidal type.

| Reference numerals |
| --- |
| 1 variator |
| 2 primary taper disc pair |
| 3 secondary taper disc pair |
| 4 continuously variable member |
| 5 electronic control unit |
| 6 electromagnetic pressure regulator |
| 7 electromagnetic pressure regulator |
| 8 oil pan |
| 9 pump |
| 10 selector lever |
| 11 input parameters |
| 12 speed of primary disc |
| 13 speed of secondary disc |
| 14 limit of range I |
| 15 limit of range II |
| 16 iV_HIGH |
| 17 iV_LOW |
| 18 limit of stoppage range |

What is claimed is:

1. A method for control of a CVT in which an electronic control unit (5) detects and monitors a speed signal (12) of a primary disc (nS1) and a speed signal (13) of a secondary disc (nS2), said electronic control unit (5) determining, via electromagnetic servo components (6, 7) and hydraulic valves, the pressure level in an adjustment area of said primary disc and in an adjustment area of said secondary disc (pSEK), characterized in that in a stationary state while driving (nS2>limit value), a ratio of a variator (iV=nS1/nS2) is determined from the speed signals of said primary (nS1) and secondary (nS2) discs, the ratio (iV) is assigned to a first characteristic field has one range of authorized and ranges of unauthorized ratios (iV), an error is detected when the ratio (iV) is in an unauthorized range wherein with the detection of the error the contact pressure level of the variator is increased in a first step and if the error continues, an emergency drive program is activated in a second step.

2. The method according to claim 1, characterized in that said range of authorized ratios has as upper limit the highest possible ratio of said variator (iV_HIGH) and as lower limit the minimum possible ratio of said variator (iV_LOW).

3. The method according to claim 2, characterized in that said first characteristic field has an additional range of the stoppage (nS2<limit value) and an error exists when the speed of said primary disc (nS1) is higher than the product from the number of revolutions of said secondary disc (nS2) multiplied by the maximum possible ratio of said variator (iV_HIGH).

4. The method according to claim 1, characterized in that in the absence of error, during a dynamic operation, from the ratio of said variator (iV) at a first (t1) and a second (t2) moment, an actual gradient of the ratio (iV_GRAD_IST) is determined from the actual gradient (iV_GRAD_IST) and the number of revolutions of said secondary disc at the second moment (nS2(t2)) an operating point is determined, said operating point is assigned to a second characteristic field, said second characteristic field has one range of authorized and one range of unauthorized operating points, an error being detected when the operating point is in the range of unauthorized operating points and with the detection of the error, the contract pressure level of said variator is increased in a first step and if the error continues, an emergency drive program is activated in a second step.

5. The method according to claim 4, characterized in that in the absence of error, the actual gradient of the ratio (iV_GRAD_IST) is compared with a theoretical gradient of the ratio (iV_GRAD_SOLL) and therefrom a divergence is detected by difference formation and the divergence is subsequently processed.

* * * * *